United States Patent
Jones et al.

(10) Patent No.: US 8,799,955 B2
(45) Date of Patent: Aug. 5, 2014

(54) APPARATUS AND METHOD FOR MANAGING MEDIA CONTENT

(75) Inventors: Todd W. Jones, Kansas City, MO (US); Douglas Medina, Grain Valley, MO (US); Frank Mitchals, Willard, MO (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 926 days.

(21) Appl. No.: 12/198,729

(22) Filed: Aug. 26, 2008

(65) Prior Publication Data

US 2010/0058430 A1 Mar. 4, 2010

(51) Int. Cl.
*H04N 5/445* (2011.01)
*G06F 3/00* (2006.01)
*G06F 13/00* (2006.01)

(52) U.S. Cl.
USPC .............. 725/46; 725/44; 725/45; 725/47

(58) Field of Classification Search
None
See application file for complete search history.

(56) References Cited

U.S. PATENT DOCUMENTS

| | | | |
|---|---|---|---|
| 4,821,097 A * | 4/1989 | Robbins | 348/485 |
| 2004/0052370 A1* | 3/2004 | Katznelson | 380/212 |
| 2004/0244029 A1* | 12/2004 | Gross | 725/9 |
| 2005/0038664 A1* | 2/2005 | Srinivas et al. | 704/501 |
| 2006/0123451 A1 | 6/2006 | Preisman | |
| 2006/0143655 A1 | 6/2006 | Ellis et al. | |
| 2008/0127271 A1* | 5/2008 | Zriny et al. | 725/46 |
| 2008/0155585 A1 | 6/2008 | Craner et al. | |
| 2008/0301732 A1* | 12/2008 | Archer et al. | 725/40 |
| 2009/0070817 A1* | 3/2009 | Ellis et al. | 725/46 |
| 2009/0089638 A1* | 4/2009 | Heise et al. | 714/748 |
| 2009/0096920 A1* | 4/2009 | Xu et al. | 348/441 |
| 2009/0106787 A1* | 4/2009 | Maissel et al. | 725/9 |
| 2009/0256855 A1* | 10/2009 | Tran | 345/589 |
| 2009/0328105 A1* | 12/2009 | Craner et al. | 725/46 |

* cited by examiner

*Primary Examiner* — Nasser Goodarzi
*Assistant Examiner* — Fred Peng
(74) *Attorney, Agent, or Firm* — Guntin & Gust, PLC; Andrew Gust

(57) ABSTRACT

A system that incorporates teachings of the present disclosure may include, for example, a set top box comprising a controller to receive media content over an Internet Protocol Television network, detect Secondary Audio Programming (SAP) content associated with the media content, present an SAP indicator with the media content to a user when the SAP content is detected for the media content, receive a selection of the SAP content by the user, and present the media content with the selected SAP content. Other embodiments are disclosed.

25 Claims, 8 Drawing Sheets

300

400

500

600

APPARATUS AND METHOD FOR MANAGING MEDIA CONTENT

FIELD OF THE DISCLOSURE

The present disclosure relates generally to network communications and more specifically to an apparatus and method for managing media content.

BACKGROUND

Television systems provide viewers with a large number of television channels over a wide geographic area. Some of these viewers can desire receiving programming in different languages. Interactive television programming guides can provide viewers with the ability to select languages for programming from digital audio tracks on a digital channel as in U.S. Patent Application No. 20060143655.

DETAILED DESCRIPTION

One embodiment of the present disclosure entails computer-readable storage medium, having computer instructions for obtaining Secondary Audio Programming (SAP) utilization history associated with a plurality of users, obtaining media content, determining SAP content associated with the media content, selecting at least a portion of the SAP content for delivery over an Internet Protocol Television network based at least in part on the SAP utilization history, and transmitting the media content and the at least a portion of the SAP content to one or more set top boxes associated with one or more of the plurality of users over a multicast communication session.

Another embodiment of the present disclosure entails a server having a controller to obtain Secondary Audio Programming (SAP) utilization history associated with a plurality of users, obtain media content, determine SAP content associated with the media content, select at least a portion of the SAP content for delivery over an Internet Protocol Television network based at least in part on the SAP utilization history, and transmit the media content and the at least a portion of the SAP content to one or more set top boxes associated with one or more of the plurality of users.

Yet another embodiment of the present disclosure entails a set top box having a controller to receive media content over an Internet Protocol Television network, detect Secondary Audio Programming (SAP) content associated with the media content, present an SAP indicator with the media content to a user when the SAP content is detected for the media content, receive a selection of the SAP content by the user, and present the media content with the selected SAP content.

Yet another embodiment of the present disclosure entails a set top box having a controller to receive media content over an Internet Protocol Television network, detect Secondary Audio Programming (SAP) content associated with the media content, and selectively present an SAP indicator to a user for detected SAP content based on at least one of a user profile and a SAP utilization history associated with the user.

Yet another embodiment of the present disclosure entails a method including receiving media content over a network, detecting Secondary Audio Programming (SAP) content associated with the media content, selectively presenting an SAP indicator with the media content to a user for detected SAP content based on at least one of detecting the SAP content, a user profile and an SAP utilization history associated with the user, receiving a selection of the SAP content by the user when the SAP indicator is selectively presented, and presenting the media content with the selected SAP content.

Figure 1:
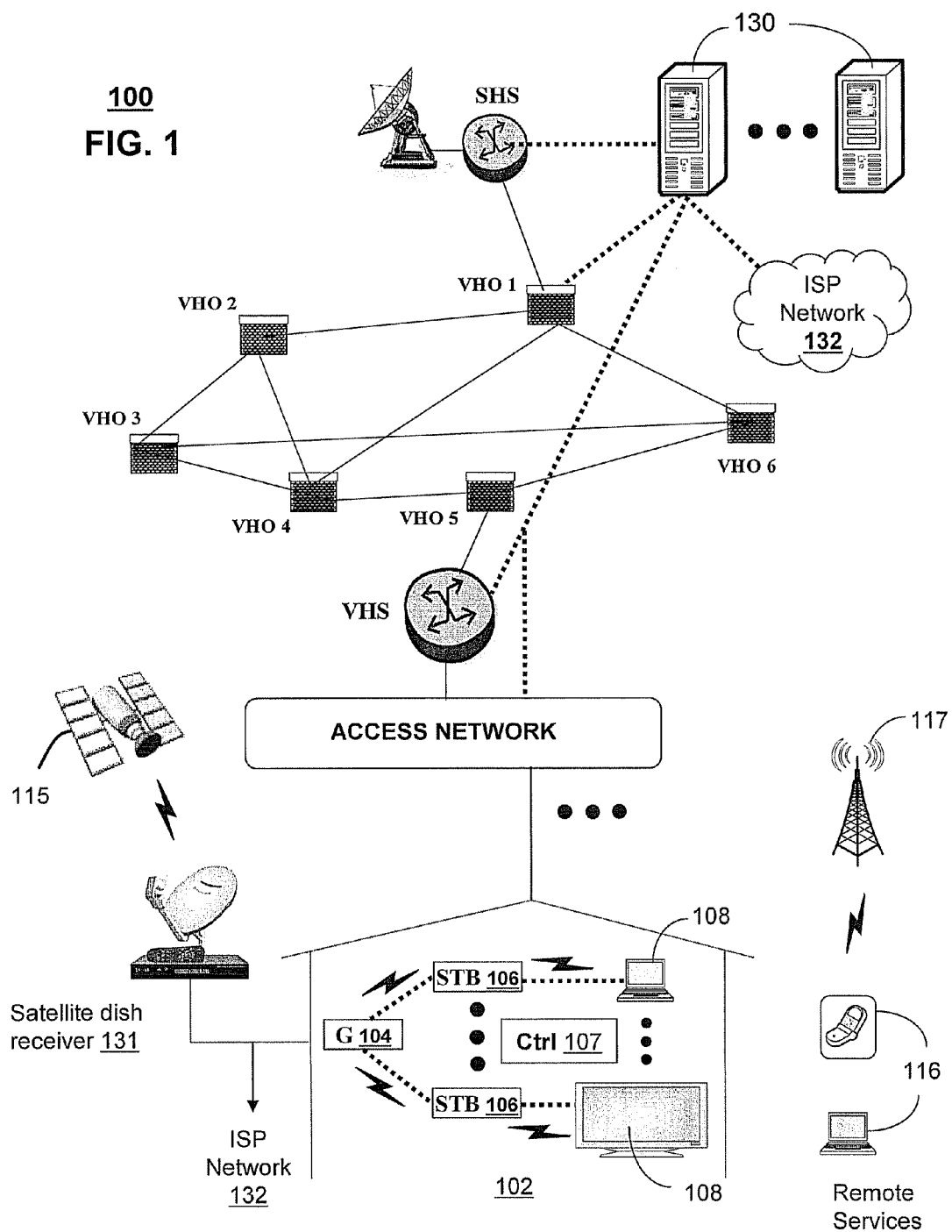
FIGS. 1-4 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via an access network (e.g., local area network (LAN)) to commercial and/or residential buildings 102 housing a gateway 104 (e.g., a residential gateway or RG). The access network can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.). In one embodiment, the computing devices 130 can comprise a network proxy for managing distribution of media services with Secondary Audio Programming (SAP) features.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
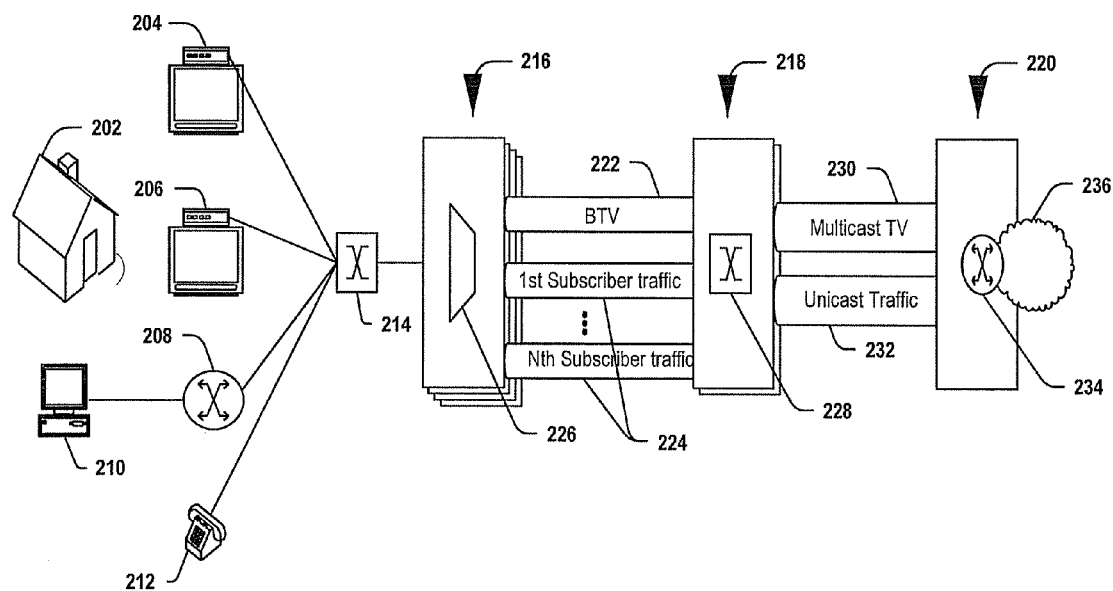

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

Figure 3:
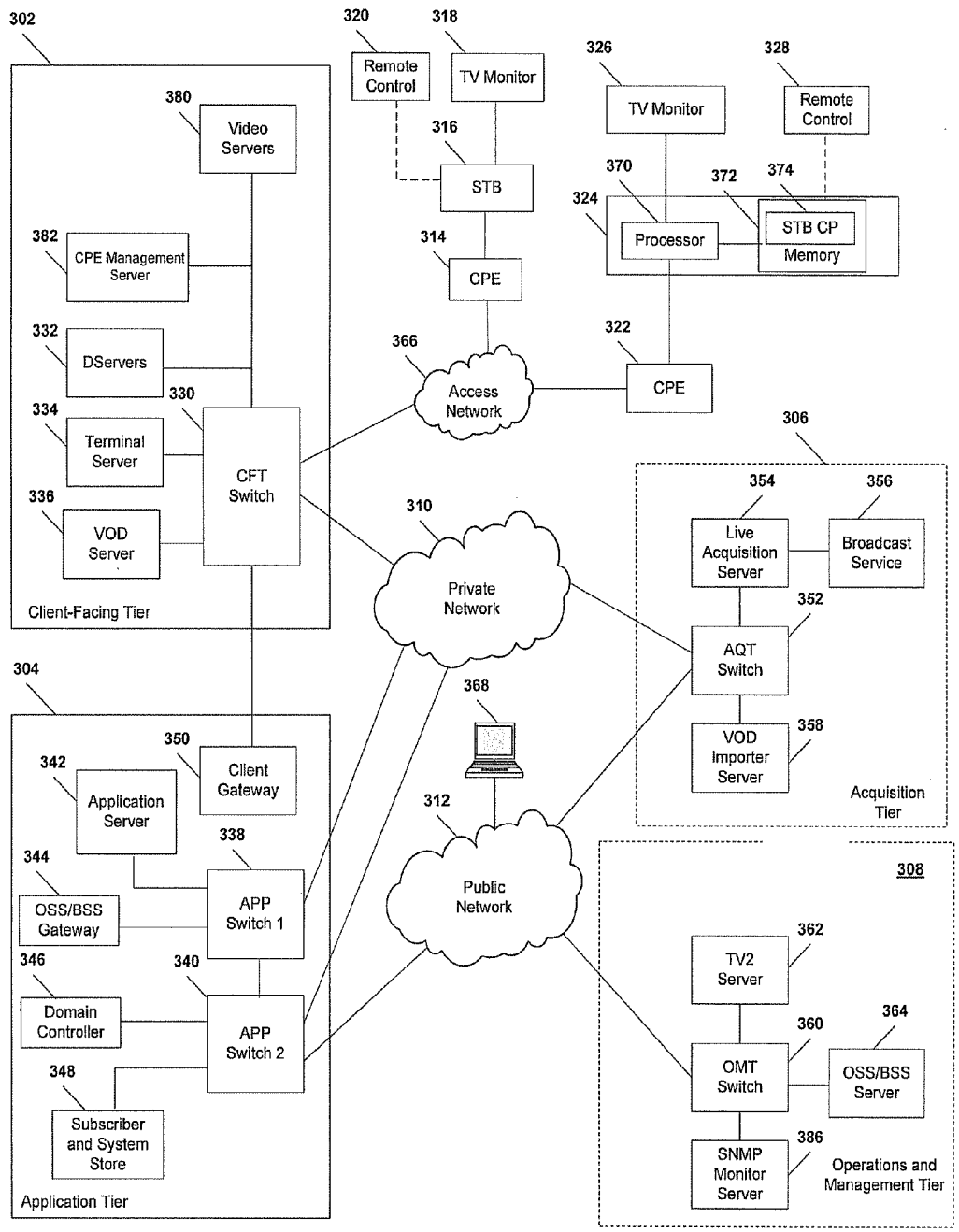

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

It should be apparent to one of ordinary skill in the art from the foregoing media communication system embodiments that other suitable media communication systems for distributing broadcast media content as well as peer-to-peer exchange of content can be applied to the present disclosure.

Figure 4:
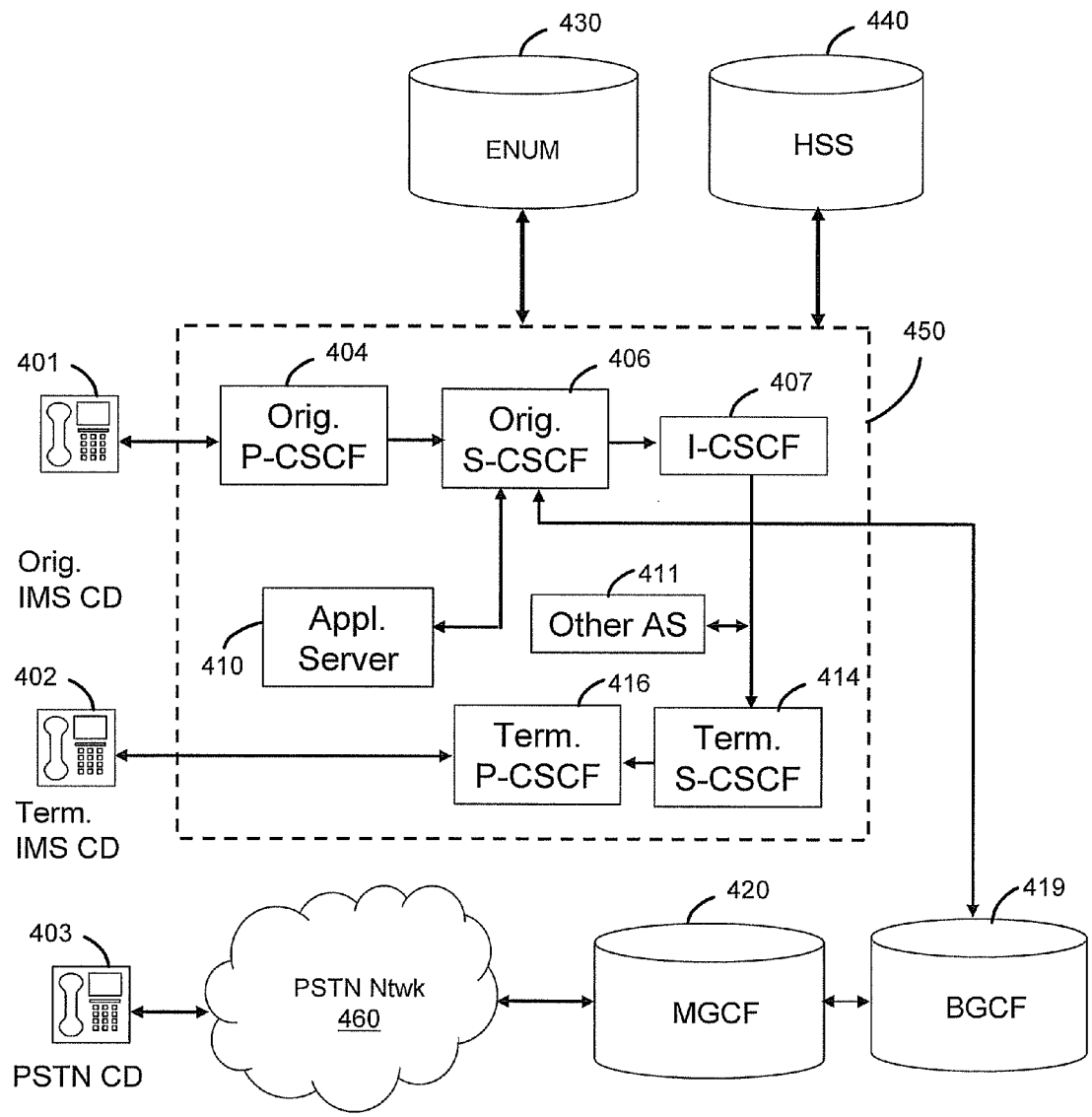

FIG. 4 depicts an illustrative embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440. To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

Figure 5:
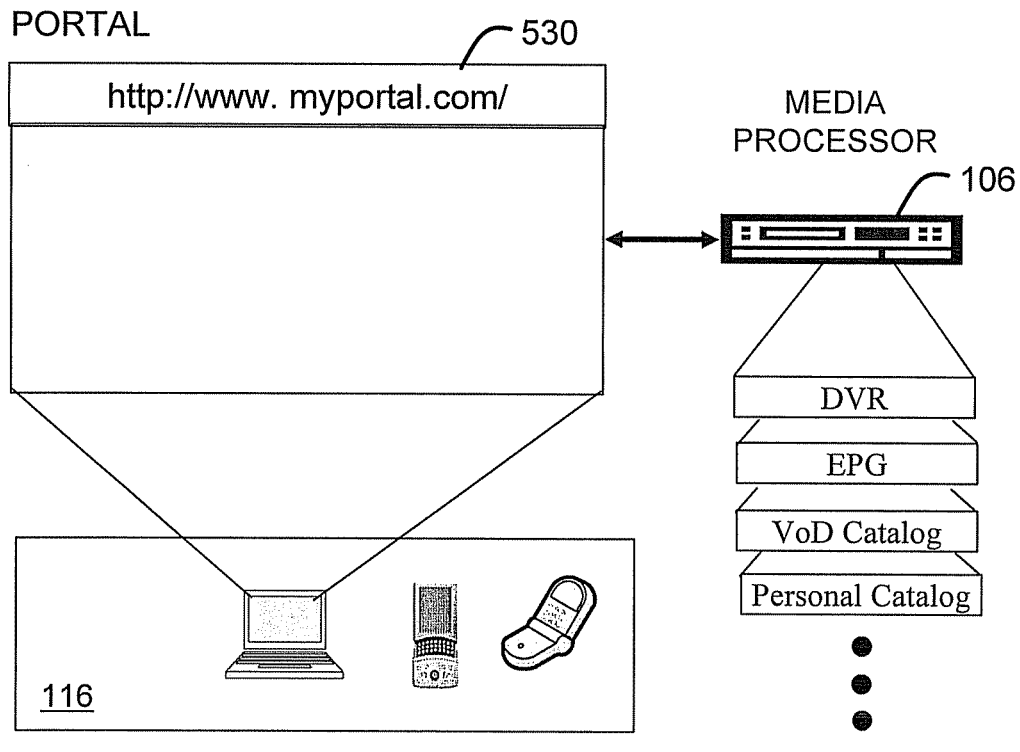
FIG. 5 depicts an illustrative embodiment of a portal interacting with at least one among the communication systems of FIGS. 1-4.

FIG. 5 depicts an illustrative embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog stored in the STB (e.g., personal videos, pictures, audio recordings, etc.), and so on.

Figure 6:
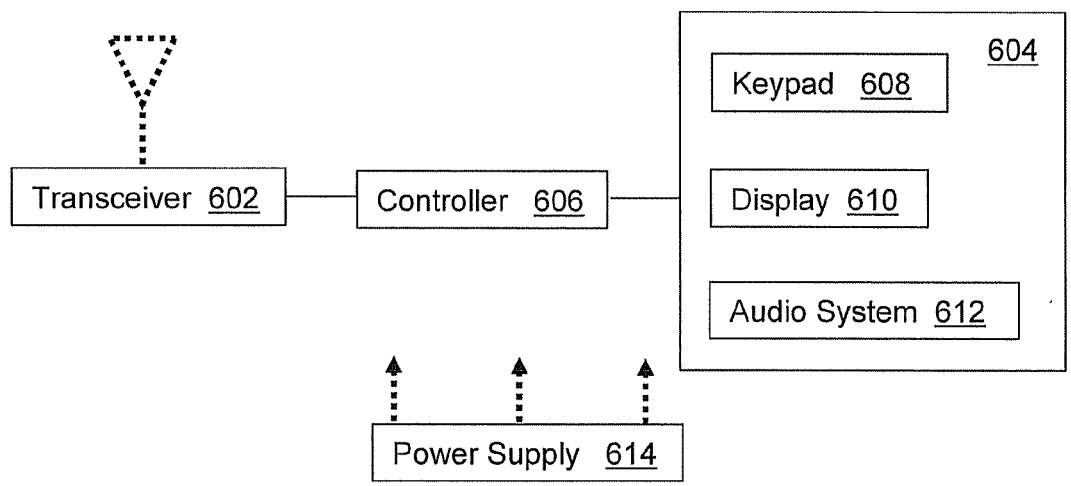
FIG. 6 depicts an illustrative embodiment of a communication device utilized in the communication systems of FIGS. 1-4.

FIG. 6 depicts an exemplary embodiment of a communication device 600. Communication device 600 can be a representative portion of any of the aforementioned communication devices of FIGS. 1-4. The communication device 604 can comprise a wireline and/or wireless transceiver 602 (herein transceiver 602), a user interface (UI) 604, a power supply 614, and a controller 606 for managing operations thereof. The transceiver 602 can support short-range or long-range wireless access technologies such as a Bluetooth wireless access protocol, a Wireless Fidelity (WiFi) access protocol, a Digital Enhanced Cordless Telecommunications (DECT) wireless access protocol, cellular, software defined radio (SDR) and/or WiMAX technologies, just to mention a few. Cellular technologies can include, for example, CDMA-1X, UMTS/HSDPA, GSM/GPRS, TDMA/EDGE, EV/DO, and next generation technologies as they arise.

The transceiver 602 can also support common wireline access technologies such as circuit-switched wireline access technologies, packet-switched wireline access technologies, or combinations thereof. PSTN can represent one of the common circuit-switched wireline access technologies. Voice over Internet Protocol (VoIP), and IP data communications can represent some of the commonly available packet-switched wireline access technologies. The transceiver 602 can also be adapted to support IP Multimedia Subsystem (IMS) protocol for interfacing to an IMS network that can combine PSTN and VoIP communication technologies.

The UI 604 can include a depressible or touch-sensitive keypad 608 and a navigation mechanism such as a roller ball, joystick, and/or navigation disk for manipulating operations of the communication device 600. The UI 604 can further include a display 610 such as monochrome or color LCD (Liquid Crystal Display), OLED (Organic Light Emitting Diode) or other suitable display technology for conveying images to the end user of the communication device 600. In an embodiment where the display 610 is touch-sensitive, a portion or all of the keypad 608 can be presented by way of the display. The UI 604 can also include an audio system 612 that utilizes common audio technology for conveying low volume audio (e.g., audio heard only in the proximity of a human ear) and high volume audio (e.g., speakerphone for hands free operation). The audio system 612 can further include a microphone for receiving audible signals of an end user.

The power supply 614 can utilize common power management technologies such as replaceable and rechargeable batteries, supply regulation technologies, and charging system technologies for supplying energy to the components of the communication device 600 to facilitate long-range or short-range portable applications. The controller 606 can utilize computing technologies such as a microprocessor and/or digital signal processor (DSP) with associated storage memory such a Flash, ROM, RAM, SRAM, DRAM or other storage technologies.

Figure 7:
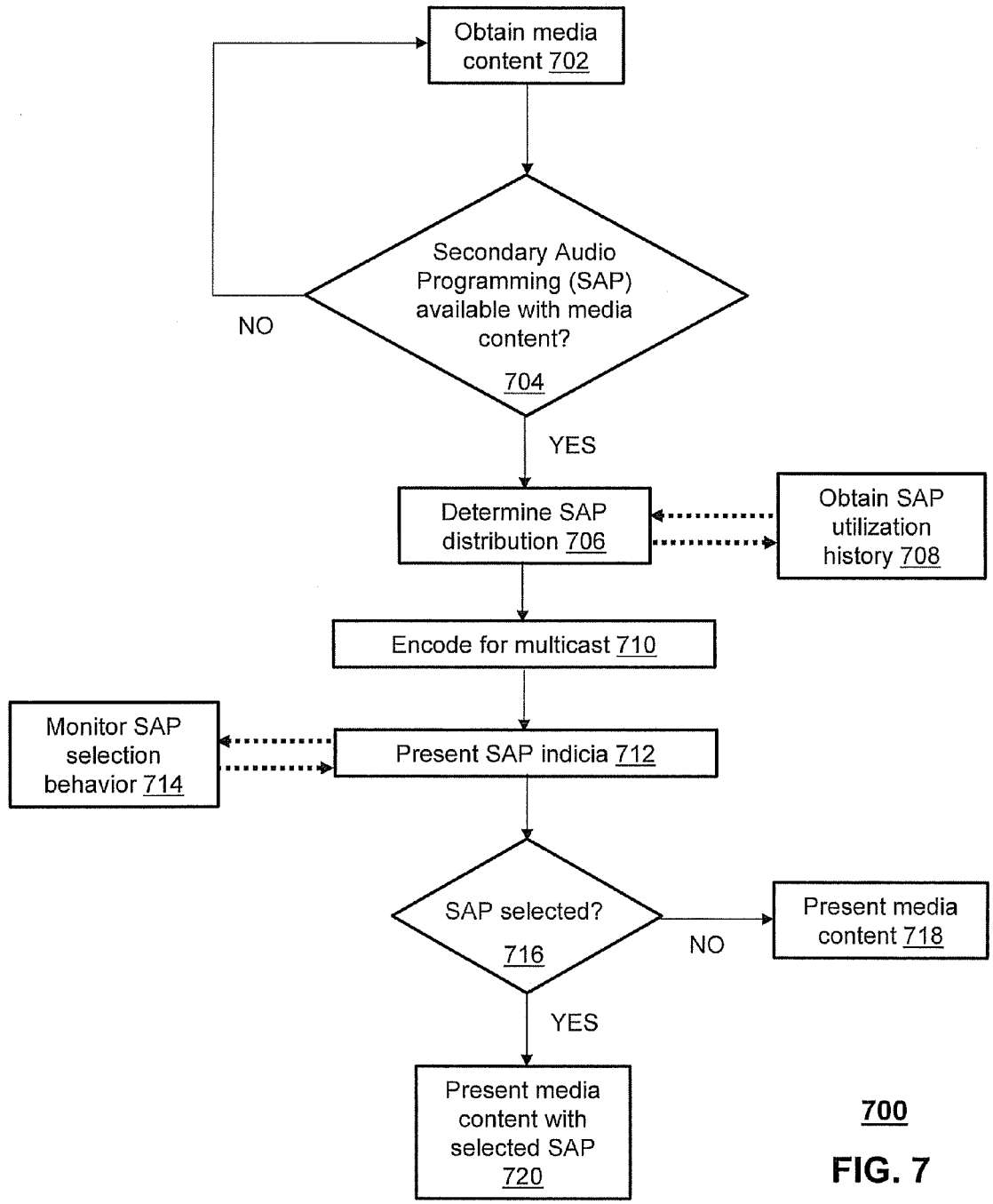
FIG. 7 depicts an illustrative embodiment of a method operating in portions of the communication systems of FIGS. 1-4.

FIG. 7 depicts an exemplary method 700 operating in portions of one or more of the communication systems 100-400. Method 700 has variants as depicted by the dashed lines. It would be apparent to an artisan with ordinary skill in the art that other embodiments not depicted in FIG. 7 are possible without departing from the scope of the claims described below.

Method 700 can begin with step 702 where media content for delivery to one or more consumers is obtained, such as through a video acquisition team receiving the content from a content provider. In step 704, the network proxy 130 can determine the SAP capability of the media content. For example, a movie can be provided with one or more alternative languages available on the SAP subcarrier of the video carrier of the movie. As another example, a movie can be provided with Descriptive Video Service (DVS) for visually impaired users, which are made available on the SAP subcarriers. Other types of SAP content can also be utilized by method 700, such as National Oceanic and Atmospheric Administration (NOAA) Weather Radio content, National Public Radio (NPR) content, Cable Public Affairs Channel content, and so forth. In one embodiment, the SAP content can be generated according to the Multichannel Television Sound (MTS) standard set by the National Television Systems Committee (NTSC). For instance, the SAP content can have a frequency deviation of ±251 kHz, where the SAP subcarrier is located at 78.670 kHz, which is five times the 15.734 kHz MTS pilot signal. The MTS pilot signal can be locked to the horizontal sync frequency of the video carrier for stability. The SAP channel can include mono-audio which has been dbx-encoded for noise reduction, to improve the signal-to-noise ratio. The SAP content can have a bandpass from 60 Hz to 12 kHz.

If the media content does not have any SAP capability then method 700 returns to step 702. If on the other hand the media content has SAP capability then in step 706, the network proxy 130 can determine the desired SAP distribution. For example, the network proxy 130 can determine which packet identifiers (PIDs), each of which is associated with an alternative language of a movie, are to be provided to encoders for processing. In one embodiment as in step 708, the network proxy 130 can determine prior utilization of SAP content, such as for particular alternative languages and include only those languages in the SAP distribution as opposed to including all available alternative languages. The techniques utilized for determining the SAP distribution can be based on a number of factors, including monitored behavior of users in a geographic area (e.g., selections of alternative languages), service agreements for providing types of SAP content (e.g., alternative languages), and so forth. In one embodiment, the utilization history can be monitored by the network proxy, such as based on utilization information transmitted from STB's 106 to the network proxy upon selection of SAP content by a user. The present disclosures also contemplates SAP distribution of all available SAP content.

In step 710, the network proxy 130 can encode the media content for multicast to the users. For example, in an IPTV environment, the network proxy 130 can cause H.264 encoders to packetize video, audio, SAP data and other various meta data information for a streaming multicast sent for distribution, such as through A-Servers to the users. The present disclosure also contemplates other types of transmission of the media content to the users (e.g., unicast and/or broadcast) and other types of television environments (cable, satellite, and so forth).

In step 712, the STB 106 can detect the presence of SAP content associated with the media content and can provide an SAP indicator or flag to the user. The indicia can take various forms, such as a semi-transparent image or audio signal indicative of the SAP availability. The particular form of the SAP indicator can be based on a user selection or user profile which provides a desired format for indicating SAP availability, including when and for how long to present the SAP indicia. A user profile can also be utilized for selectively providing SAP indicators, such as a user who only desires alternative language SAP indicators for movies. In one embodiment in step 714, The presentation of the SAP indicator can be based on monitored behavior of a user. For example, a user with a history of viewing alternative language programming on alternative language channels can be presented SAP indicators for media content where the particular alternative language for the media content being presented is available. As another example, a user who has previously selected SAP alternative language presentation can be provided with an SAP indicator where the particular alternative language for the media content being presented is available.

In step 716, the STB 106 can determine if an SAP content has been selected. If the user has not selected SAP content then in step 718 the STB 106 can present the media content with its original audio. If on the other hand, a user has selected SAP content then in step 720 the STB 106 can present the media content but with the SAP content. For example, the STB 106 can apply a packet filter to remove all of the language signals except for the selected alternative language based on the PID associated with the selected language.

Upon reviewing the aforementioned embodiments, it would be evident to an artisan with ordinary skill in the art that said embodiments can be modified, reduced, or enhanced without departing from the scope and spirit of the claims described below. For example, the SAP content can include alternative language audio and video signals, such as text language in a game show or the like. A user can select either or both of the alternative audio and text SAP content. In one embodiment, the SAP content can be alternative language audio that is superimposed on the original audio signals of the media content where the original audio language signals are filtered out. In yet another embodiment, the user can be provided with control of the characteristics of the SAP content, such as volume, which is independent of the characteristics of the media content, such as background audio volume. In another embodiment, the SAP content can be similar to the original audio media content but with adjusted characteristics. For instance, the SAP content can be the same language but with a different accent. As another example, the SAP content can include changes to the audio parameters such as volume changes, stereo, and so forth.

Other suitable modifications can be applied to the present disclosure without departing from the scope of the claims below. Accordingly, the reader is directed to the claims section for a fuller understanding of the breadth and scope of the present disclosure.

Figure 8:
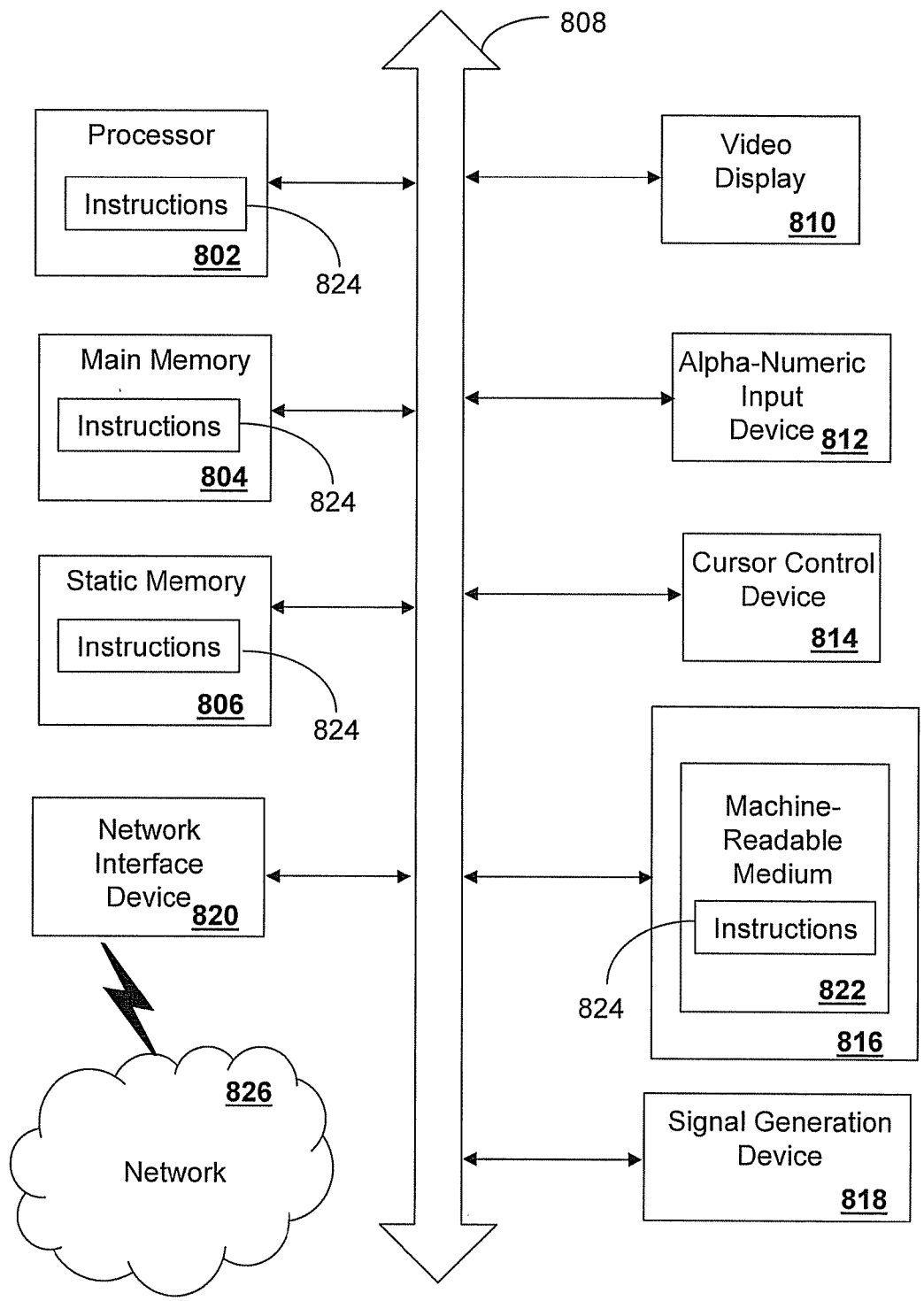
FIG. 8 is a diagrammatic representation of a machine in the form of a computer system within which a set of instructions, when executed, may cause the machine to perform any one or more of the methodologies discussed herein.

FIG. 8 depicts an illustrative diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a computer-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute computer-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the computer-readable medium 822 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a computer-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-readable storage device, comprising instructions that, when executed by a processor, cause the processor to perform operations comprising:
    obtaining secondary audio programming utilization history associated with a user associated with a set top box;
    obtaining media content comprising video data;
    determining secondary audio programming content associated with the media content, wherein the secondary audio programming content comprises a plurality of available alternative languages associated with the media content;
selecting a portion of the secondary audio programming content among a subset of the plurality of available languages for delivery over an Internet Protocol Television network based in part on the secondary audio programming utilization history, wherein the secondary audio programming utilization history is limited to selections of alternative languages made by the user in the past at the set top box; and
transmitting the media content and the portion of the secondary audio programming content that is selected to the set top box that is associated with the user over a multicast communication session, wherein the portion of the secondary audio programming content selected among the subset of the plurality of available languages is transmitted on an secondary audio programming subcarrier of a video signal associated with the media content, and wherein the set top box presents the video data of the media content and the portion of the secondary audio programming content at a presentation device.

2. The computer-readable storage device of claim 1, wherein the set top box detects a presence of the portion of the secondary audio programming content and presents a secondary audio programming indicator based on the presence that is detected and further comprising transmitting text content corresponding to the portion of the secondary audio programming content, wherein the text content is in a same alternative language as the portion of the secondary audio programming content.

3. The computer-readable storage device of claim 1, comprising instructions that, when executed by the processor, causes the processor to perform operations comprising encoding video, audio and secondary audio programming signals associated with the media content and the portion of the secondary audio programming content in a multicast stream.

4. The computer-readable storage device of claim 1, comprising instructions that, when executed by the processor, causes the processor to perform operations comprising monitoring selections among the plurality of alternative languages in service agreements for providing types of secondary audio programming.

5. The computer-readable storage device of claim 1, comprising instructions that, when executed by the processor, causes the processor to perform operations comprising:
monitoring the secondary audio programming utilization history based on utilization information gathered from the set top box when selection of secondary audio programming content is made; and
transmitting the secondary audio programming utilization history to a network proxy from the set top box.

6. The computer-readable storage device of claim 1, comprising instructions that, when executed by the processor, cause the processor to perform operations comprising controlling a volume of the portion of the secondary audio programming content independent of controlling a volume of the media content.

7. The computer-readable storage device of claim 1, wherein the set top box presents selected secondary audio programming content of the portion of the secondary audio programming content based on a packet identifier associated with the selected secondary audio programming content.

8. A server comprising:
a memory to store instructions; and
a processor coupled to memory, wherein the processor responsive to executing the instructions, performs operations comprising:
monitoring for secondary audio programming utilization history associated with a user, wherein the secondary audio programming utilization history is limited to alternative secondary audio programming content selections that correspond to an alternative language that has been used in the past at a set top box by the user;
obtaining media content comprising video data;
determining secondary audio programming content associated with the media content, wherein the secondary audio programming content comprises a plurality of available alternative languages associated with the media content;
selecting a portion of the secondary audio programming content among a subset of the plurality of available languages for delivery over an Internet Protocol Television network based in part on the secondary audio programming utilization history according to the alternative secondary audio programming content selections that correspond to the alternative language that has been used in the past at the set top box by the user; and
transmitting the media content and the portion of the secondary audio programming content selected to the set top box associated with the user, wherein the portion of the secondary audio programming content selected among the subset of the plurality of available languages is transmitted on an secondary audio programming subcarrier of a video signal associated with the media content, and wherein the set top box presents the video data of the media content and the portion of the secondary audio programming content at a presentation device.

9. The server of claim 8, wherein the processor further performs operations comprising encoding video signals, audio signals, and secondary audio programming signals associated with the media content and the portion of the secondary audio programming content selected in a multicast stream.

10. The server of claim 8, wherein the processor further performs operations comprising monitoring the secondary audio programming utilization history as selection of secondary audio programming content is made at the set top box and transmitted to a network proxy.

11. The server of claim 10, wherein the processor further performs operations comprising receiving utilization data from the set top box when the portion of the secondary audio programming content selected is presented to a user.

12. The server of claim 8, wherein the portion of the secondary audio programming content comprises alternative languages associated with the media content having controllable characteristics that are independent of the characteristics of the media content.

13. The server of claim 8, wherein the processor further performs operations comprising transmitting packet identifiers associated with the portion of the secondary audio programming content, and wherein the set top box presents a selected secondary audio programming content of the portion of the secondary audio programming content selected using filtering based on one of the packet identifiers.

14. The server of claim 13, wherein the set top box detects a presence of the portion of the secondary audio programming content selected and presents a secondary audio programming indicator based on the presence that is detected.

15. A set top box comprising:
a memory to store instructions; and a processor coupled to the memory, wherein the processor, responsive to executing the instructions, performs operations comprising:

receiving media content comprising video data over an Internet Protocol Television network;

detecting secondary audio programming content associated with the media content, wherein the secondary audio programming content comprises a plurality of available alternative languages associated with the media content;

presenting a secondary audio programming indicator with the media content when the secondary audio programming content is detected for the media content;

receiving a selection of the secondary audio programming content among a subset of the plurality of available languages;

presenting the video data of the media content with the secondary audio programming content at a presentation device; and transmitting secondary audio programming utilization information to a network proxy when the media content with the secondary audio programming content that is selected, wherein the secondary audio programming utilization information is used for determining a secondary audio programming distribution to the set top box, wherein a portion of the secondary audio programming content that is selected among the subset of the plurality of available languages is received by the set top box on an secondary audio programming subcarrier of a video signal associated with the media content, and wherein the secondary audio programming utilization information is limited to selections in the past of an alternative language by a user at the set top box.

16. The set top box of claim 15, wherein the processor further performs operations comprising filtering the secondary audio programming content to present the secondary audio programming content that is selected based on a packet identifier.

17. The set top box of claim 15, wherein the processor further performs operations comprising presenting the secondary audio programming indicator based on a user profile.

18. The set top box of claim 15, wherein the secondary audio programming indicator is one of an opaque message, a semi-transparent message or an audio message.

19. The set top box of claim 15, wherein the processor further performs operations comprising transmitting secondary audio programming utilization information to the network proxy when the video data of the media content with the secondary audio programming content that is selected and presented.

20. A set top box comprising:
a memory to store instructions; and
a processor coupled to the memory, wherein the processor, responsive to executing the instructions, performs operations comprising:

receiving media content comprising video data over an Internet Protocol Television network;

detecting secondary audio programming content associated with the media content, wherein the secondary audio programming content comprises a plurality of available alternative languages associated with the media content;

selectively presenting at a presentation device a secondary audio programming indicator for the secondary audio programming content based on a user profile and a secondary audio programming utilization history associated with a user that is limited to user selections at the set top box that correspond to an alternative language that has been used in the past at the set top box by the user, wherein the secondary audio programming content is a portion of the plurality of available alternative languages received by the set top box on an secondary audio programming subcarrier of a video signal associated with the media content; and presenting the video data and the secondary audio programming content at the presentation device.

21. The set top box of claim 20, wherein the processor further performs operations comprising:
receiving a selection of the secondary audio programming content; and
presenting the video data of the media content with the secondary audio programming content.

22. The set top box of claim 20, wherein the secondary audio programming content comprises alternative languages associated with the media content having controllable characteristics that are independent of the characteristics of the media content.

23. A method, comprising:
receiving, by a system comprising a processor, video data of media content over a network;

detecting, by the system, secondary audio programming content associated with the media content wherein the secondary audio programming content comprises a plurality of available alternative languages associated with the media content;

selectively presenting, by the system, a secondary audio programming indicator with the media content at a presentation device for detected secondary audio programming content based on one of detecting the secondary audio programming content or a user profile and further based on a secondary audio programming utilization history associated with a user that is limited to selections of an alternative language that has been used in the past at a set top box by the user;

receiving, by the system, a selection of the secondary audio programming content when the secondary audio programming indicator is selectively presented; and presenting, by the system, the video data of media content with the secondary audio programming content at the presentation device, wherein a portion of the secondary audio programming content selected among a subset of the plurality of available languages is received on an secondary audio programming subcarrier of a video signal associated with the media content.

24. The method of claim 23, comprising transmitting, by the system, secondary audio programming utilization information from a set top box to a network proxy when the video data of the media content and the secondary audio programming content is presented to the user.

25. The method of claim 23, wherein the detected secondary audio programming content comprises alternative languages associated with the media content, and further comprising adjusting, by the system, text displayed with the media content to correspond to a language associated with the secondary audio programming content.

* * * * *